July 28, 1936.    G. L. CUNNINGHAM    2,049,249
CONVERSION OF SODIUM SESQUICARBONATE TO SODIUM CARBONATE DECAHYDRATE
Filed July 6, 1932
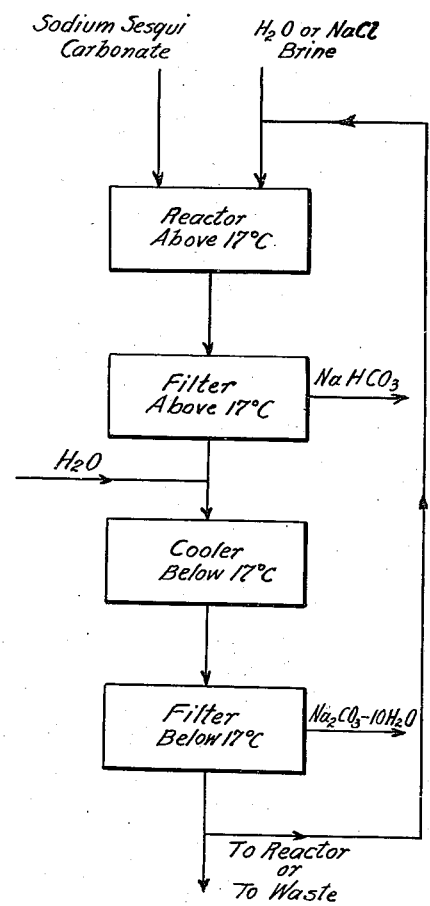
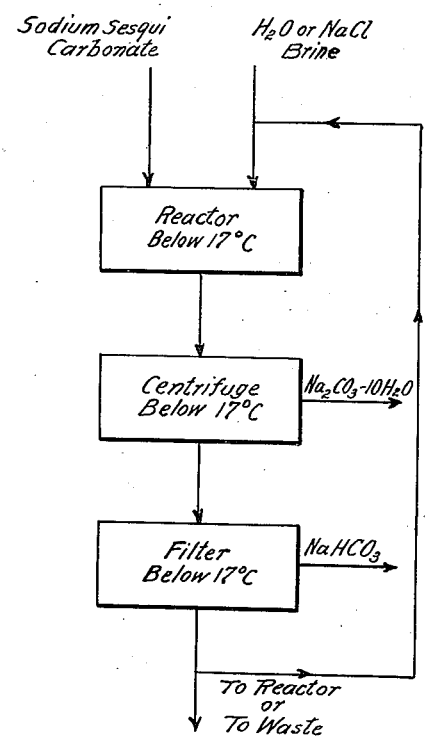
INVENTOR
George Lewis Cunningham
BY
Pennie, Davis, Marvin & Edmonds
ATTORNEYS Patented July 28, 1936

2,049,249

UNITED STATES PATENT OFFICE 2,049,249

CONVERSION OF SODIUM SESQUICARBONATE TO SODIUM CARBONATE DECAHYDRATE

George Lewis Cunningham, Niagara Falls, N. Y., assignor to The Mathieson Alkali Works, Inc., New York, N. Y., a corporation of Virginia Application July 6, 1932, Serial No. 621,057

4 Claims. (Cl. 23—63)

This invention relates to improvements in the manufacture of sodium carbonate decahydrate, $Na_2CO_3 \cdot 10H_2O$. More particularly, the invention relates to improvements in the conversion of sodium sesquicarbonate, $Na_2CO_3 \cdot NaHCO_3 \cdot 2H_2O$, to sodium carbonate decahydrate. The invention includes, in one specific aspect, a method involving recovery of sodium carbonate decahydrate at low temperature and separate recovery of sodium bicarbonate at higher temperature from an aqueous sodium carbonate solution to which sodium carbonate is supplied as sodium sesquicarbonate and, in another aspect, a method involving the simultaneous precipitation of sodium carbonate decahydrate and sodium bicarbonate from an aqueous sodium carbonate solution to which sodium carbonate is supplied as sodium sesquicarbonate at low temperature and separation of the precipitated sodium carbonate decahydrate and sodium bicarbonate as part of the recovery operation.

According to the present invention, the conversion of sodium sesquicarbonate to sodium carbonate decahydrate is accomplished by subjecting the sodium sesquicarbonate to the action of an amount of water limited to effect the precipitation of sodium bicarbonate, by separating the sodium bicarbonate so precipitated from the solution, and by precipitating and separating sodium carbonate decahydrate from the solution at a temperature below about 17° C. The water may be supplied to the reaction as water or, for example, as an aqueous solution of sodium chloride. The amount of water used is with advantage limited to precipitate a maximum proportion of sodium bicarbonate. The sodium bicarbonate may be precipitated separately from the sodium carbonate decahydrate by precipitating the sodium bicarbonate at a temperature upwards of about 17° C., separating the precipitated sodium bicarbonate, cooling the solution to a temperature below about 17° C., and precipitating and separating the sodium carbonate decahydrate at this lower temperature. Or the sodium bicarbonate and the sodium carbonate decahydrate may be precipitated simultaneously at a temperature below about 17° C. and the precipitated sodium bicarbonate and sodium carbonate decahydrate then separated mechanically. Such mechanical separation of sodium bicarbonate and sodium carbonate decahydrate is easily accomplished because of the divergent crystal form and habit of these two salts. The precipitation and separation of sodium carbonate decahydrate is with advantage effected at a temperature approximating 0° C., whether the sodium carbonate decahydrate is precipitated alone or simultaneously with sodium bicarbonate. Cyclic operation of the invention requires the addition of water removed as water of crystallization in the sodium carbonate decahydrate over that amount supplied as water of crystallization in the sodium sesquicarbonate. Where, in cyclic operation, the sodium bicarbonate and the sodium carbonate decahydrate are separately precipitated and separated, at a temperature upwards of 17° C. and at a temperature below 17° C., respectively, such water is with advantage added to the solution from which sodium bicarbonate has been separated before precipitation and separation of the sodium carbonate decahydrate.

In the present invention the sodium sesquicarbonate is subjected to the action of an amount of water limited to effect the precipitation of sodium bicarbonate. This amount of water may be expressed in terms of the ratio $$H_2O : NaHCO_3 \cdot Na_2CO_3 \cdot 2H_2O$$

by weight. The maximum proportion of water to sodium sesquicarbonate above which no $NaHCO_3$ can be precipitated follows:

| Temp. °C. | Weight ratio $H_2O:NaHCO_3.Na_2CO_3.2H_2O$ |
|---|---|
| 0 | 7.34 |
| 15 | 5.9 |
| 30 | 4.6 |
| 45 | 3.56 |
| 60 | 3.04 |

The minimum ratio of water to sodium sesquicarbonate is 1.89 at 17° C. and 0.64 at 0° C.

The invention will be illustrated by the following specific examples:

I. 75.3 parts (by weight) of sodium sesquicarbonate are treated with 160 parts of water at 20° C. 19.7 parts of sodium bicarbonate are precipitated and separated from the liquor by filtration. 26 parts of water are then added to the liquor and the diluted liquor is cooled to 0° C. About 63 parts of sodium carbonate decahydrate, substantially free from sodium bicarbonate, are precipitated and separated from the liquor by filtration. This separated precipitate constitutes the sodium carbonate decahydrate product of the operation. About 48 parts of sodium sesquicarbonate are added to the liquor from which the sodium carbonate decahydrate has been separated and this mixture is heated to about 20° C. Again, about 19.7 parts of sodium bicarbonate are precipitated and separated from the liquor by filtration, water is added to the liquor and the diluted liquor is cooled, sodium carbonate decahydrate is precipitated and separated as before, and so on.

II. The operation is carried out as in the preceding example, except in that 75.3 parts of sodium sesquicarbonate are initially treated with about 380 parts of an aqueous solution of sodium chloride containing 15.4% NaCl instead of with 160 parts of water.

III. Sodium sesquicarbonate is added to a solution saturated with respect to sodium carbonate decahydrate and sodium bicarbonate, i. e. a solution saturated with these two salts at the temperature employed, at a temperature below about 17° C., advantageously at a temperature approximating 0° C. Sodium carbonate decahydrate and sodium bicarbonate precipitate simultaneously, the bicarbonate crystallizing in crystals of microscopic size and the decahydrate crystallizing in long heavy needles. The mixed slurry is centrifuged, using a coarse screen permitting the sodium bicarbonate crystals to pass through with the liquor and retaining the sodium carbonate decahydrate crystals, and the centrifuged liquor is subjected to filtration to separate the sodium bicarbonate crystals. Sodium sesquicarbonate and water, in amount corresponding to the difference in hydration of the sodium sesquicarbonate and the sodium carbonate decahydrate, are added to the filtered liquor and the operation is repeated.

Operations of the type illustrated by the third example, in which sodium bicarbonate and sodium carbonate decahydrate are precipitated simultaneously, involve mechanical separation of the sodium bicarbonate and the sodium carbonate decahydrate but, when operated cyclically, afford important economies in that they make unnecessary that part of the refrigeration required in re-cooling the circulating liquor in each cycle of the operation by eliminating alternate cooling and heating of the circulating liquor.

The accompanying drawing illustrates, as flow sheets, operations embodying the invention. Fig. 1 further illustrates operations of the type illustrated by Examples 1 and 2. Fig. 2 further illustrates operations of the type illustrated by Example 3.

I claim:

1. In the conversion of sodium sesquicarbonate to sodium carbonate decahydrate, the improvement which comprises subjecting the sodium sesquicarbonate to the action of an amount of water limited to effect the precipitation of sodium bicarbonate, separating the sodium bicarbonate so precipitated from the solution at a temperature upwards of 17° C., and thereafter precipitating and separating sodium carbonate decahydrate from the solution at a temperature below 17° C.

2. In the conversion of sodium sesquicarbonate to sodium carbonate decahydrate, the improvement which comprises subjecting the sodium sesquicarbonate to the action of an amount of water limited to effect precipitation of sodium bicarbonate, precipitating sodium bicarbonate at a temperature upwards of 17° C., separating the precipitated sodium bicarbonate, cooling the solution from which the precipitated sodium bicarbonate is separated, thereafter precipitating and separating sodium carbonate decahydrate from the cooled solution at a temperature below 17° C., adding sodium sesquicarbonate and water to the solution from which the precipitated sodium carbonate decahydrate has been separated and precipitating sodium bicarbonate at a temperature upwards of 17° C. in a repetition of the operation.

3. In the conversion of sodium sesquicarbonate sodium carbonate decahydrate, the improvements which comprises subjecting the sodium sesquicarbonate to the action of an amount of water limited to effect precipitation of sodium bicarbonate, precipitating sodium bicarbonate at a temperature upwards of 17° C., separating the precipitated sodium bicarbonate, adding water to and cooling the solution from which the precipitated sodium bicarbonate is separated, thereafter precipitating and separating sodium carbonate decahydrate from the cooled solution at a temperature below 17° C., adding sodium sesquicarbonate to the solution from which the precipitated sodium carbonate decahydrate has been separated and precipitating sodium bicarbonate at a temperature upwards of 17° C. in a repetition of the operation.

4. In the conversion of sodium sesquicarbonate to sodium carbonate decahydrate, the improvement which comprises subjecting the sodium sesquicarbonate to the action of an amount of an aqueous solution of sodium chloride limited to effect the precipitation of sodium bicarbonate, separating the sodium bicarbonate so precipitated from the solution at a temperature upwards of 17° C., and precipitating and separating sodium carbonate decahydrate from the solution at a temperature below 17° C.

GEORGE LEWIS CUNNINGHAM.